United States Patent Office 3,116,105
Patented Dec. 31, 1963

3,116,105
ZINC-SODIUM POLYPHOSPHATE, SODIUM POLY-
PHOSPHATE, CHELATING AGENT CORROSION
INHIBITING COMPOSITION
Herman Kerst, Des Plaines, Ill., assignor to Dearborn
Chemical Company, Chicago, Ill., a corporation of
Illinois
No Drawing. Filed Feb. 15, 1961, Ser. No. 89,358
14 Claims. (Cl. 21—2.7)

The present invention deals with a method and composition for treating water and, more particularly, for treating flowing water streams such as in cooling tower waters, to reduce the amount of corrosion appearing as attack on metal contacted by such circulating water.

The treatment of cooling water is a problem which appears in many industries as well as railroad, marine, and industrial equipment which includes condensers, heat exchangers diesel engines, compressors, and air conditioning systems.

One of the most widely used systems for treating cooling water consists in incorporating into the circulating water stream small amounts of a molecularly dehydrated alkali metal polyphosphate in combination with a soluble chromate, such as sodium dichromate. This is the so-called "Polychrome" treatment which is quite effective in controlling scale and metal corrosion due to the circulating water. One of the major disadvantages, however, of this type of treatment is the fact that the chromates are quite toxic and their use in circulating water systems which are eventually diverted into natural water courses has been substantially limited by local regulation.

More recently, the use of dimetallic zinc alkali metal polyphosphates has become more frequent because the combination has been found to provide better scale control and corrosion control than the alkali metal polyphosphates alone. However, the addition of the zinc compounds still does not eliminate the need for additional chromate if satisfactory corrosion protection is to be achieved. The addition of the zinc, moreover, provides an additional problem by reason of the precipitation of zinc compounds, particularly in dissolving tanks in which the solutions are made up prior to being pumped into the cooling systems.

One of the objects of the present invention is to provide an improved method for treating water systems generally, and cooling water systems particularly, to protect against excessive corrosion, and particularly against localized pitting of metal surfaces.

A further object of the invention is to provide an improved water treating method which does not require the use of chromates.

Still another object of the invention is to provide improved water treating compositions for the control of scale and corrosion of metals in which the beneficial advantages of zinc may be realized without the problems of zinc precipitation heretofore encountered.

Another object of the present invention is to provide a non-toxic water treating composition for use in circulating water systems.

I have now found that the corrosion inhibiting ability of a zinc alkali metal polyphosphate can be improved, without precipitation of zinc, by the addition of an alkali metal polyphosphate and a small amount of a chelating agent to the combination. Additional benefits are obtained if small amounts of a non-ionic surface active agent are added to the composition.

The zinc polyphosphate which may be employd in the process of the present invention can be any of the zinc containing glassy phosphates which are available. For example, one such material contains about eight molecular proportions of sodium oxide, eight molecular proportions of phosphorus pentoxide, and one molecular proportion of zinc oxide. A commercially available zinc compound is known as "Calgon-TG" which is essentially sodium hexametaphosphate containing about 7.2% zinc.

The alkali metal polyphosphate which is used in the combination can be any of the polyphosphates which have been described in the literature and in previous patents as "molecularly dehydrated alkali metal phosphates." These materials are normally alkali metal polyphosphates having a ratio of alkali oxide to phosphorus pentoxide ranging from about 0.4 to 1 to about 2 to 1. Phosphates which fall within this class include compounds such as sodium septaphosphate, tetrasodium pyrophosphate, sodium tripolyphosphate, sodium tetraphosphate, sodium hexametaphosphate, and sodium decaphosphate.

The chelating agent which might be used may be any of the wide variety of water soluble chelating agents presently available. In general, the three main classes of these materials are (1) polycarboxylic-polyamine compounds, (2) hydroxy polycarboxylic acids, and (3) nitrilo polyacetic acids.

The polycarboxylic polyamine compounds can be represented by the following structural formula:

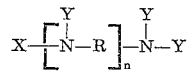

where X is $CH_2COOM$ or $CH_2CH_2COOM$; Y is the same or different members of the group consisting of H, $CH_2COOM$, $CH_2CH_2COOM$, $CH_2CH_2OH$, and alkyl groups containing from 1 to 20 carbon atoms; M is hydrogen, an alkali metal, or ammonium radicals; R is a hydrocarbon group containing from 2 to 6 carbon atoms; and $n$ is an integer from 0 to 4.

As representative compounds of this class, I may mention ethylenediamine tetraacetic acid, ethylenediamine triacetic acid, triethylenetetramine tetraacetic or pentaacetic acid, ethanolethylenediamine triacetic acid, diethanol diethylene triamine triacetic acid, diethylene triamine pentapropionic acid, ethylene diamine tetrapropionic acid, and dodecyl trimethylene diamine triacetic acid. All of these materials are normally used in the form of their alkali metal salts.

Also included is the class of nitrilo polyacid compounds. This consists of such members as nitrilodiacetic acid, nitrilotriacetic acid, nitrilo dipropionic acid, etc. These materials are effective chelating agents and can be used for the purposes of the present invention.

By far the most important hydroxy polycarboxylic acid chelating agent is citric acid, but other acids of this class such as tartaric, gluconic, glucoheptonic, saccharic, and mucic acid may be employed, but with less effective results. Obviously, water soluble salts of these acids can be used as their source.

As the non-ionic surface active agent, I can employ a mixed ethylene oxide and propylene oxide in the form of a block polymer having a molecular weight in the range from about 1500 to 12,000. These materials are commercially available under the trademark "Pluronics." They are prepared by reacting monomeric propylene glycol with a sufficient amount of propylene oxide to form a polypropylene glycol having a desired molecular weight and then the glycol is reacted with ethylene oxide in the presence of a strongly alkaline catalyst at slightly elevated pressures so that polyethoxy groups are atached at both ends of the polypropylene glycol.

Another useful class of non-ionic detergents are those materials which are sold under the name "Ucons." These compounds are monoalkyl ethers of polyoxyalkylene glycols in which the ethoxy and propoxy chains are distributed at random in the molecule.

Still another class consists of the "Tetronics." These compounds are condensation products of propylene oxide and ethylene oxide with polyamines containing from two to six carbon atoms. They are produced by condensing ethylene diamine or other diamine with propylene oxide to a predetermined molecular weight on the order of 2000. This product is then reacted with ethylene oxide until the desired degree of hydrophilicity is obtained.

Another example of suitable non-ionic agent is the polyethylene glycol mono-ester prepared by condensing a polyethylene glycol having a molecular weight of from about 200 to 20,000 with a carboxylic acid having from 10 to 24 carbon atoms per molecule.

The dosages employed for each of the ingredients will vary depending upon the severity of the corrosion problem. In general, I prefer to use, for every 100 parts by weight of the zinc-sodium polyphosphate, from 10 to 100 parts by weight of the molecularly dehydrated alkali metal polyphosphate, and from 1 to 50 parts by weight of the chelating agent. The non-ionic surface active agent, when added, may be used in amounts from 0.5 to 10 parts by weight for every 100 parts by weight of the zinc-sodium polyphosphate.

A particularly preferred formula is the following:

| | Parts |
|---|---|
| Zinc-sodium polyphosphate ("Calgon-TG") | 60 |
| Sodium tripolyphosphate | 30 |
| Citric acid | 10 |

The compositions of the present invention were tested in a simulated cooling tower in the following way. Water was circulated through a stainless steel pail and a Pyrex coupon chamber. The temperature was controlled by an electric immersion heater and thermo-regulator. Make-up treatment agents were pumped continuously through the system and the overflow went to waste. The test coupons of steel were suspended in the flowing water and their weight loss was determined. The duration of each test was ten days.

Various polyphosphates and sequestering agents have been evaluated in this test and the results are tabulated below in comparison with the results obtained by the use of equivalent dosages of zinc sodium polyphosphate. (EDTA is the abbreviation for the sodium salt of ethylenediamine tetraacetic acid.)

| Treatment | Polyphosphate Residual Dosage (p.p.m.) | pH | Temp., °F. | Corrosion Rate at End of 10 Days Test (M.P.Y.) |
|---|---|---|---|---|
| Blank | | 6.5 | 130 | 61.0 |
| Zinc-Sodium Polyphosphate ("Calgon-TG") | 20 | 6.5 | 130 | [1] 8.0 |
| "Calgon-TG" 60%, Na Tripolyphosphate 30%, Citric Acid 10% | 17 | 6.5 | 130 | [2] 4.8 |
| "Calgon-TG" 65%, Na Tripolyphosphate 30%, EDTA 5% | 16 | 6.5 | 110 | [2] 4.8 |
| "Calgon-TG" 58%, Na Tripolyphosphate 30%, EDTA 10%, "Pluronic L-42" 2% | 15 | 7.5 | 130 | [2] 3.6 |
| "Calgon-TG" 60%, Na Tripolyphosphate 30%, Ethylene Diamine Tetrapropionic Acid 10% | 17 | 6.5 | 130 | [2] 3.7 |
| "Calgon-TG" 60%, Na Tripolyphosphate 30%, Hydroxy Alkyl Ethylene Diamine Triacetic Acid 10% | 18 | 6.5 | 130 | [2] 3.0 |

[1] Pitting.
[2] No pitting.

Tests have also been run in two small commercial cooling towers which are used for testing purposes. These towers have a capacity of 100 gallons, and water is pumped at a rate of 13 g.p.m. Steam heated exchangers produce water at 130° F. which is circulated over the corrosion specimens and to the spray heads at the top of the tower. There is a 30° F. temperature drop as the water falls through a forced draft of air. The pH is automatically controlled. Blowdown and treatment are continuous. Tests are run for one month. Results of typical tests are as follows:

| Treatment | Polyphosphate Residual Dosage (p.p.m.) | pH | Temp., °F. | Corrosion rate at end of Month (M.P.Y.) |
|---|---|---|---|---|
| "Calgon-TG" | 20 | 6.5 | 130 | [1] 2.5 |
| "Calgon-TG" 60%, Na Tripolyphosphate 30%, Citric Acid 10% | 20 | 6.5 | 130 | [2] 3.5 |
| "Calgon-TG" 60%, Na Tripolyphosphate 30%, EDTA 10% | 20 | 6.5 | 130 | [2] 2.9 |
| "Calgon-TG" 58%, Na Tripolyphosphate 30%, EDTA 10%, "Pluronic L-42" 2% | 20 | 6.5 | 130 | [2] 1.5 |
| "Calgon-TG" 58%, Na Tripolyphosphate 30%, Citric Acid 10%, "Pluronic L-42" 2% | 20 | 6.5 | 130 | [2] 1.5 |

[1] Deep pitting.
[2] No pitting.

In the simulated cooling tower tests the corrosion rates shown by the combinations are lower than those shown by "Calgon-TG," and the frequency and severity of pitting are reduced. In the cooling towers the most noteworthy benefit was the reduction in pitting. In addition, the composition containing the sodium tripolyphosphate and the sequestering agent dissolves rapidly in cold hard water to give a clear stable solution which can be readily fed to the circulating water system. The zinc-sodium polyphosphate by itself is slow in dissolving, and in hard water gives insoluble precipitates of zinc polyphosphate and orthophosphate. In addition, the circulating water tested with the composition is clear, whereas that treated by zinc-sodium polyphosphate is cloudy.

The compositions of the present invention provide adequate corrosion resistance for various types of metals, particularly ferrous metals, copper, aluminum, brass, and zinc. They also provide threshold scale control in small dosages. For most cooling water systems, the addition of 1 to 100 parts per million of the mixture will suffice for adequate treatment.

It will be evident that various modifications can be made to the described embodiments without departing from the scope of the present invention.

I claim as my invention:

1. The method of conditioning a circulating water stream to reduce the corrosive attack on metal surfaces which it contacts which comprises introducing into said water a combination consisting essentially of a zinc-sodium polyphosphate, a molecularly dehydrated alkali metal polyphosphate, and a water soluble chelating agent and thereafter flowing the water in contact with said metal surfaces.

2. The method of claim 1 in which the combination includes, for every 100 parts by weight of zinc-sodium polyphosphate, from 10 to 100 parts by weight of the molecularly dehydrated alkali metal polyphosphate, and from 1 to 50 parts by weight of the chelating agent.

3. The method of claim 1 in which said combination is added in an amount from 1 to 100 parts per million of the water.

4. The method of conditioning a circulating water stream to reduce the corrosive attack on metal surfaces which it contacts which comprises introducing into said stream a combination consisting essentially of a zinc-sodium polyphosphate, a molecularly dehydrated alkali metal polyphosphate, and a water soluble hydroxy polycarboxylic acid and thereafter flowing said stream in contact with said surfaces.

5. The method of conditioning a circulating water stream to reduce the corrosive attack on metal surfaces which it contacts which comprises introducing into said stream a combination consisting essentially of a zinc-sodium polyphosphate, a molecularly dehydrated alkali metal polyphosphate, and citric acid and thereafter flowing said stream in contact with said surfaces.

6. The method of conditioning a circulating water stream to reduce the corrosive attack on metal surfaces which it contacts which comprises introducing into said stream a combination consisting essentially of a zinc-sodium polyphosphate, a molecularly dehydrated alkali metal polyphosphate, and ethylenediamine tetraacetic acid sodium salt and thereafter flowing said stream in contact with said surfaces.

7. The method of conditioning a circulating water system to reduce its corrosive attack upon contacting metal surfaces which comprises introducing into said system from 1 to 100 parts per million of a mixture consisting essentially of a zinc-sodium polyphosphate, a molecularly dehydrated alkali metal polyphosphate, and citric acid, said alkali metal polyphosphate being present in an amount from 10 to 100 parts by weight and said citric acid being present in an amount of from 1 to 50 parts by weight for every 100 parts by weight of said zinc-sodium polyphosphate.

8. A corrosion inhibiting composition consisting essentially of a mixture of a zinc-sodium polyphosphate, a molecularly dehydrated alkali metal polyphosphate, and a water soluble chelating agent.

9. A corrosion inhibiting composition consisting essentially of a mixture of a zinc-sodium polyphosphate, a molecularly dehydrated alkali metal polyphosphate, and citric acid.

10. A corrosion inhibiting composition consisting essentially of a mixture of a zinc-sodium polyphosphate, a molecularly dehydrated alkali metal polyphosphate, and ethylenediamine tetraacetic acid sodium salt.

11. A corrosion inhibiting composition consisting essentially of a mixture of a zinc-sodium polyphosphate, a molecularly dehydrated alkali metal polyphosphate, and a water soluble chelating agent, said composition including for every 100 parts by weight of zinc-sodium polyphosphate, from 10 to 100 parts by weight of said alkali metal polyphosphate, and from 1 to 50 parts by weight of said chelating agent.

12. A corrosion inhibiting composition consisting essentially of a mixture of a zinc-sodium polyphosphate, a molecularly dehydrated alkali metal polyphosphate, and citric acid, said composition including for every 100 parts by weight of zinc-sodium polyphosphate, from 10 to 100 parts by weight of said alkali metal polyphosphate, and from 1 to 50 parts by weight of said citric acid.

13. A corrosion inhibiting composition consisting essentially of a mixture of a zinc-sodium polyphosphate, a molecularly dehydrated alkali metal polyphosphate, a water soluble chelating agent, and a non-ionic surface active agent.

14. A corrosion inhibiting composition consisting essentially of about 60% by weight of a zinc-sodium polyphosphate, about 30% by weight of a molecularly dehydrated alkali metal polyphosphate, and about 10% by weight citric acid.

References Cited in the file of this patent

UNITED STATES PATENTS

| | | |
|---|---|---|
| 2,332,209 | Enquist | Oct. 19, 1943 |
| 2,529,177 | Nieland et al. | Nov. 7, 1950 |
| 2,777,818 | Gambill | Jan. 15, 1957 |
| 2,786,033 | Gottshall et al. | Mar. 19, 1957 |
| 2,877,085 | George et al. | Mar. 10, 1959 |
| 2,900,222 | Kahler et al. | Aug. 18, 1959 |
| 2,999,732 | Kahler et al. | Sept. 12, 1961 |